United States Patent [19]

Berger

[11] Patent Number: 5,129,312

[45] Date of Patent: Jul. 14, 1992

[54] RADIANT BAFFLE ASSEMBLY FOR GAS-FIRED COOKER

[75] Inventor: Bernard B. Berger, Aiken, S.C.

[73] Assignee: The Ducane Company, Inc., Columbia, S.C.

[21] Appl. No.: 685,658

[22] Filed: Apr. 16, 1991

[51] Int. Cl.$^5$ .......................... A23B 4/04; A47J 37/00; A47J 37/04

[52] U.S. Cl. .................. 99/340; 99/421 V; 99/447; 99/482; 126/41 R

[58] Field of Search ............... 99/339, 340, 375, 376, 99/385, 390, 393, 395, 400, 401, 482, 419, 421 H, 421 V, 447; 126/86, 41 R, 39 J, 39 D, 39 R

[56] References Cited

U.S. PATENT DOCUMENTS

| | | | |
|---|---|---|---|
| 1,258,992 | 3/1918 | Davis | 126/86 |
| 1,491,570 | 4/1924 | Thornblade | 126/41 R |
| 1,702,900 | 2/1929 | Humphrey | 99/447 |
| 1,959,558 | 5/1934 | Van Damm | 126/86 |
| 2,043,601 | 6/1936 | Windemuller | 99/447 |
| 2,262,910 | 11/1941 | Aller | 99/482 |
| 3,122,134 | 2/1964 | Reeves | 99/421 H |
| 3,152,242 | 10/1964 | De Mott . | |
| 3,152,243 | 10/1964 | Andrews . | |
| 3,182,585 | 5/1965 | Rensch et al. | 99/421 H |
| 3,327,093 | 6/1967 | Hager, Jr. et al. . | |
| 3,334,620 | 8/1967 | De Werth | 126/41 R |
| 3,732,803 | 5/1973 | Buxmann | 99/357 |
| 3,742,838 | 7/1973 | Luschen et al. | 99/389 |
| 4,089,258 | 5/1978 | Berger | 99/339 |
| 4,209,006 | 6/1980 | Marsalko | 126/25 R |
| 4,226,178 | 10/1980 | Geissler et al. | 99/447 |
| 4,295,034 | 10/1981 | Assmann | 99/447 |
| 4,619,190 | 10/1986 | Smith | 99/400 |
| 4,627,410 | 12/1986 | Jung | 99/339 |
| 4,697,506 | 10/1987 | Ducate, Jr. | 99/482 |

FOREIGN PATENT DOCUMENTS

| | | | |
|---|---|---|---|
| 361043 | 5/1906 | France | 126/41 R |
| 570022 | 12/1957 | Italy | 126/41 R |

*Primary Examiner*—Timothy F. Simone
*Attorney, Agent, or Firm*—Pollock, Vande Sande & Priddy

[57] ABSTRACT

A radiant baffle assembly for gas-fired outdoor grills wherein food mounted on a spit in a cooking zone is cooked from the side by a vertically extending baffle structure which is heated to radiant temperatures by its contact with combustion gases and radiant energy provided by burning gaseous fuel from a horizontal gas burner. A forwardly facing surface of the baffle structure radiates heat transversely toward a side of the cooking zone, while an upper portion of this surface directs rising combustion gases transversely toward the same side of the cooking zone. The baffle structure may include a baffle member having ridges and grooves in a lower portion for enhancing heating of the baffle structure and its radiation of heat energy.

29 Claims, 4 Drawing Sheets

FIG_5

RADIANT BAFFLE ASSEMBLY FOR GAS-FIRED COOKER

TECHNICAL FIELD

The present invention relates to gas-fired cookers, such as outdoor grills for cooking food outdoors on a patio or the like. More particularly, the invention relates to gas-fired outdoor grills having a vertically extending heating zone for cooking spit-mounted food by providing heat energy from the side, and optionally having a horizontally extending heating zone for enhancing spit-cooking or for cooking grid supported food by providing heat energy from below the food to be cooked.

BACKGROUND OF THE INVENTION

Grilling devices which have vertical fireboxes for cooking food by radiant heat from the side, and which optionally include a horizontal firebox for cooking food from below, are known. For example, U.S. Pat. No. 4,089,258, which was issued to the same applicant (Berger), and the contents of which are incorporated herein by reference, describes a portable cooking unit having a gas-fired vertical firebox assembly that can be used alone or in combination with a gas-fired horizontal firebox.

The vertical firebox assembly described in the Berger patent comprises a radiant heat source in the form of a plurality of ceramic briquettes stacked in a vertical array and heated to radiant temperatures. In this arrangement, the heated briquettes are retained in the vertical array by abutment against a forward lattice or screen, and collectively provide a source of radiant heat having a relatively large radiating surface. However, there are several disadvantages in the use of ceramic briquettes, including a substantial "heat-up" period before a radiant temperature is achieved, absorption of heat by the retaining lattice which is between the briquettes and the cooking zone, the inconvenience and expense of handling and stacking the individual briquettes, the necessity of replacing thermally fractured or damaged briquettes, and the cost of the original and replacement briquettes.

SUMMARY OF THE INVENTION

It is accordingly a principal object of the present invention to provide an improved vertically extending heating component for supplying thermal energy through the side of a food cooking zone. Another object of this invention is to provide a gas-fired cooking unit having an improved vertically extending heating component for transferring thermal energy to food on a rotating spit, both by radiation and by convection of hot combustion gases from at least one gas burner.

Additional objects of the invention include providing a vertical heating component that requires no coals, briquettes or other discrete radiants, that requires no heat absorbing lattice or screen between the radiant surfaces and the food to be cooked, that radiates a substantially greater amount of thermal energy per unit of vertical heating area, and that can be manufactured at substantially lower cost than vertical fireboxes of conventional design. Other objects of this invention will be apparent from the accompanying drawings and the more detailed description given below.

In accordance with the present invention, there is provided a radiant baffle assembly for a gas-fired cooking unit, and this assembly includes a vertically extending baffle member. The cooking unit includes housing means for defining heating and cooking zones, food-holding means mounted on the housing means for supporting food within the cooking zone, and horizontally-extending gas burner means positioned below the baffle member of the radiant baffle assembly. The baffle assembly further comprises a pair of upstanding sidewalls spaced apart in opposing relation and having upper and lower end portions. The lower end portions of the sidewalls may be configured to cooperate with the horizontally-extending gas-fired burner means.

The vertical baffle member extends between the sidewalls and has an upper baffle portion and a lower baffle portion. The upper baffle portion extends upwardly from the lower baffle portion and transversely toward the cooking zone so s to direct rising hot combustion gases toward the side of the cooking zone. The upper baffle portion preferably extends entirely over the combustion zone defined by the flames of the gas burner means.

The lower baffle portion may be planar, but preferably comprises at least one horizontally extending and transversely projecting ridge to increase the surface area for receiving thermal energy from the hot combustion gases as they arise from the burner means and for radiating this thermal energy toward the side of the cooking zone. The one or more ridges preferably extend at least partially over the combustion zone, the length and width of which is defined by the flames that burn the gas emitted through one or more orifices of the gas burner means.

The radiating area of the lower portion of the baffle member is more preferably increased by the formation therein of a plurality of alternating ridges and grooves, which thereby further increases the thermal energy radiated to the cooking zone at a given baffle temperature. It is believed that the one or more ridges also slow the upward flow and increase the turbulence of the hot combustion gases as they rise and flow transversely across the ridge(s). All of these factors tend to increase the heat transferred from the combustion gases to the baffle member structure, and thereby increase the radiant energy provided to the cooking zone by the baffle assembly.

DETAILED DESCRIPTION OF THE INVENTION

Figure 1:
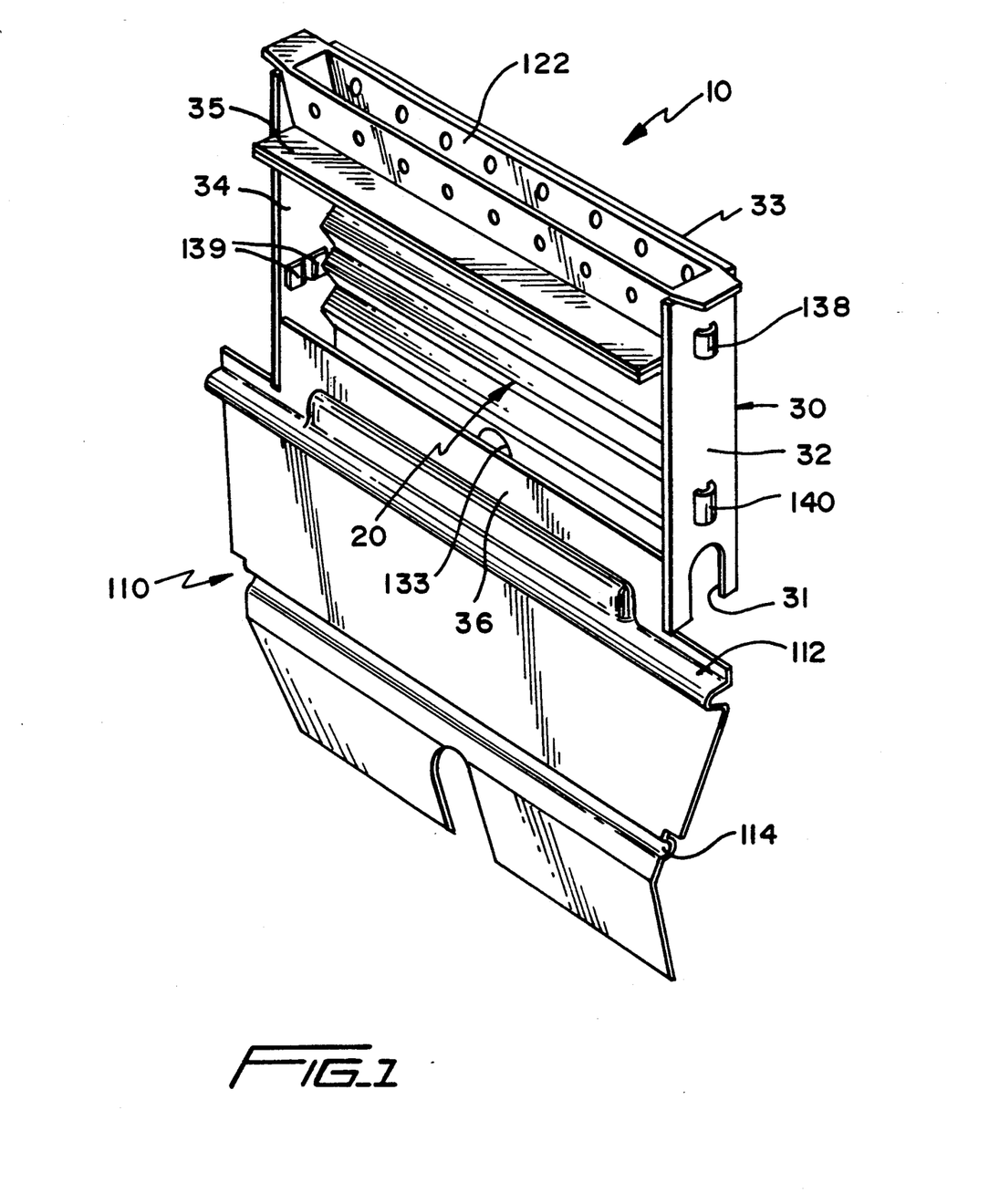
FIG. 1 is a perspective view of one embodiment of the radiant baffle assembly of the present invention.
Figure 2:
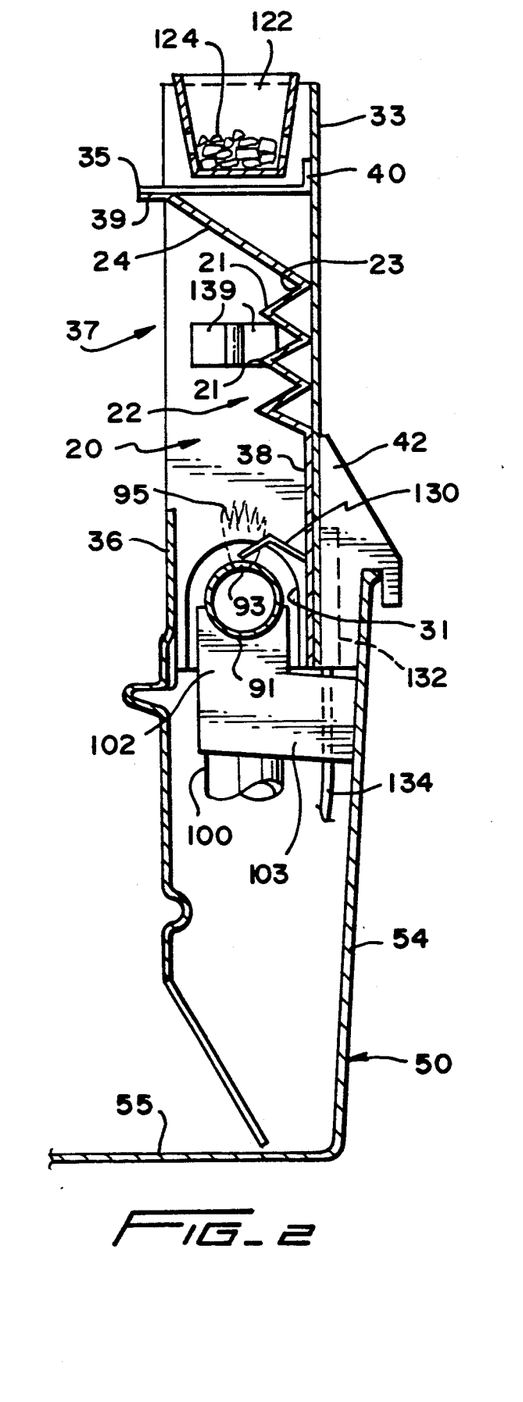
FIG. 2 is a fragmentary side elevational view showing the radiant baffle assembly of FIG. 1 in section.

Referring to FIGS. 1 and 2 of the drawings, a radiant baffle assembly 10 according to a preferred embodiment of the present invention comprises a vertical frame 30 and a vertically extending baffle member 20 mounted therein.

Vertical frame 30 defines a vertical firebox and comprises a pair of opposing sidewalls 32 and 34, a back wall 33, a front wall 36, and a top wall 35. Along the rear edge of top wall 35 is an upstanding flange 40 which is secured to rear wall 33 by spot welding or the like. Sidewalls 32 and 34 are provided with inverted U-shaped slots 31 for accommodating the respective ends of a horizontally disposed tubular gas burner 91, which is positioned adjacent to the lower rear corner of a cooking zone C (FIG. 5) and has one or more gas emitting orifices 93. Back wall 33 of firebox frame 30 is provided with a pair of horizontally spaced hangers 42 (only one of which is shown) for engaging rear wall 54 of a lower housing 50 to support firebox frame 30 in its operable vertical position wherein baffle member 20 overlies gas burner 91.

The baffle member 20 of the present invention preferably extends horizontally for substantially the full distance between sidewalls 32 and 34 of frame 30, but is not connected to these sidewalls for the reasons given below. Baffle member 20 comprises an upper forwardly slanted and substantially planar baffle portion 24, and a lower corrugated baffle portion 22. Corrugated baffle portion 22 comprises at least one horizontally extending ridge, and preferably a plurality of horizontally extending alternating ridges 21 and grooves 23. Alternating ridges 21 and grooves 23 provide a sawtooth profile in transverse cross section as shown in FIG. 2.

Figure 3:
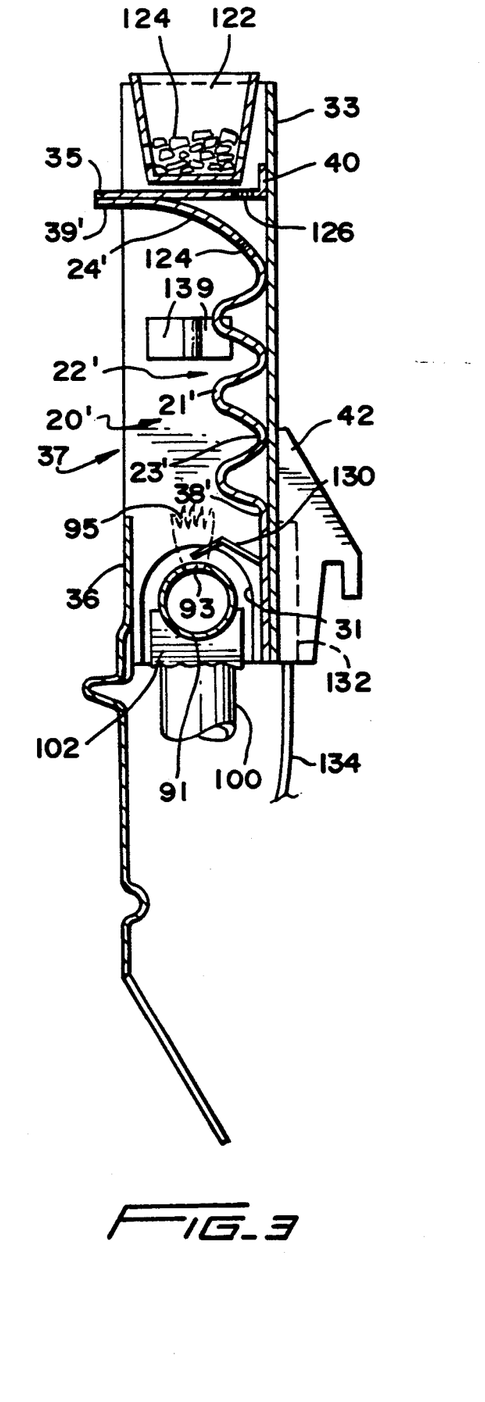
FIG. 3 is a fragmentary side elevational view in section showing a modification of the radiant baffle assembly of the present invention.
Figure 4:
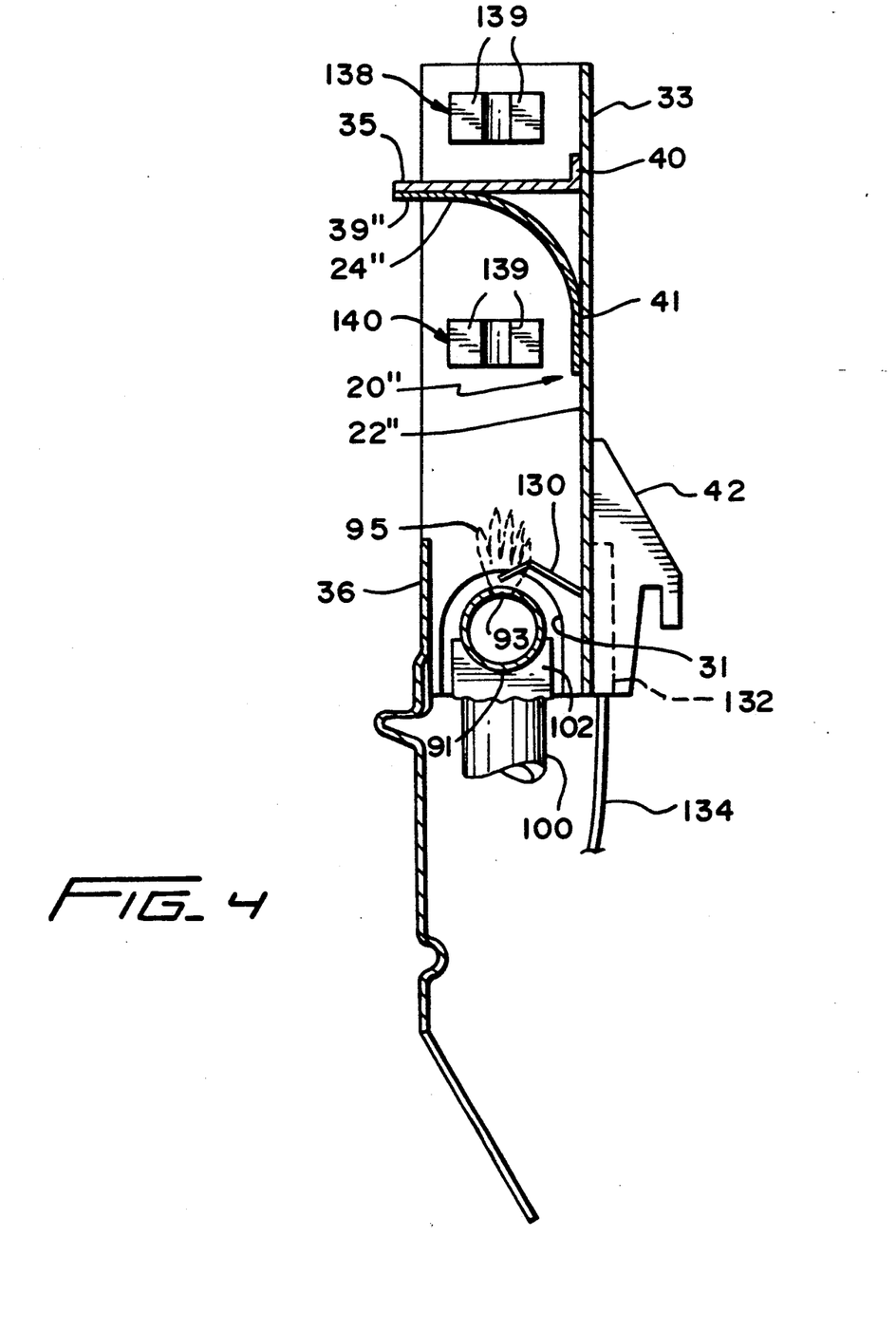
FIG. 4 is a fragmentary side elevational view in section showing another modification of the radiant baffle assembly of the present invention.

Alternatively, a baffle member 20' may be provided, which comprises an upper curved portion 24' and a lower corrugated portion 22' formed by alternating ridges 21' and grooves 23', which provide a smoothly sinuous profile in transverse cross section as shown in FIG. 3. As a further alternative, a baffle member 20" may be provided, which comprises an upper curved portion 24" and a lower substantially planar portion 22", the latter of which may be formed by a lower part of the back wall 33 of frame 30 as shown in FIG. 4. The baffle member may be made as a single integral piece or as separate pieces integrally connected together, and also may comprise a modification or a combination of the cross-sectional profiles of FIGS. 2–4.

The ridges 21,21' and grooves 23,23' may be either regular (substantially uniform) in profile as shown, or they may be irregular (non-uniform) in profile, such as by exhibiting variations in size, shape and/or spacing. However, regularity in the corrugated portion 22,22' is preferred in order to achieve economies in fabricating the baffle member 20,20'.

In the preferred embodiments shown in FIGS. 2 and 3, the baffle members 20 and 20' extend horizontally for substantially the full distance between sidewalls 32 and 34, and ridges 21,21' and grooves 23,23' extend for substantially the full width of the baffle members and face toward an open area 37 extending vertically between the relatively narrow front wall 36 and a forward edge part 39,39' of upper baffle portion 24,24'. Forward edge part 39,39' is secured, such as by spot welding or the like, to top wall 35. A lower edge part 38,38' of baffle member 20,20', which is below lower corrugated portion 22,22', is secured to rear wall 33 by similar means. The corrugated baffle portion 22,22' and upper baffle portion 24,24' are not attached at their side edges to the respective sidewalls 32 and 34 in order to allow free expansion and contraction of these portions as they are heated and cooled. This significantly reduces the thermal stresses generated by interactions between baffle member 20,20' and firebox frame 30 during heating and cooling of the radiant baffle assembly.

Similarly, curved upper baffle portion 24" in the embodiment of FIG. 4 is secured at forward edge part 39" to top wall 35 and at lower edge part 41 to back wall 33, but the side edges thereof are not attached to the respective sidewalls 32 and 34. However, lower baffle portion 22" may be attached at its side edges to sidewalls 32 and 34 when it comprises part of back wall 33, particularly where back wall 33 and sidewalls 32 and 34 are formed from a single piece of stamped sheet metal.

The corrugated baffle portions 22 and 22' in the embodiments of FIGS. 2 and 3, respectively, most preferably start from a level at about 2 to 3 inches above the top of burner 91 and extend upwardly from this starting level for a distance of about 2 to 3 more inches. The depths of grooves 23,23', as measured from the peak of an adjacent ridge 21,21', may suitably range from about $\frac{3}{8}$ of an inch to more than 1 inch, preferably in the range of about $\frac{1}{2}$ to $\frac{3}{4}$ of an inch, and the distance from peak to peak of ridges 21,21' may be from about $\frac{3}{8}$ of an inch to more than 1 inch, preferably in the range of about $\frac{1}{2}$ to $\frac{3}{4}$ of an inch. The number of ridges may suitably range from 1 to about 6, preferably 2 to 4, and more preferably 3, or about 1 to 3 per inch, more preferably about 2 per inch.

Baffle members 20,20' and 20" are preferably made from a heat resistant material such as, for example a heat and corrosion-resistant metal, a ceramic, or a ceramic-coated metal. However, in view of the relative ease of fabrication, the preferred material is a heat and corrosion resistant metal such as, for example, a stainless steel.

When radiant baffle assembly 10 is mounted in or on the grill housing of a cooker, the hot combustion gases, which are generated when a combustible gas emitted through burner orifice(s) 93 is burned in a flame 95, rise above tubular burner 91 and come into heat transfer contact with the contoured surface of baffle member 20,20',20", thereby heating the baffle member to radiant temperatures. The contoured surface of the heated baffle member then radiates thermal energy toward the side of the cooking zone. The contoured baffle surface includes those surfaces of both the upper and lower portions of the baffle member located opposite to the open area 37 of frame 30.

The upwardly flowing combustion gases, upon leaving lower baffle portion 22,22',22", then contact upper baffle portion 24,24',24" of baffle member 20,20',20" and are directed thereby toward the side of the cooking zone, where the convection heat of these hot combustion gases supplements the radiant heat radiated into the cooking zone by the contoured surface of the baffle.

As already described, upper baffle portion 24,24',24" may be either substantially planar as shown in FIG. 2 or curved as shown in FIGS. 3 and 4. In the embodiments of FIGS. 2 and 3, preferably about 80%, more preferably about 90%, of the heat received by food in the cooking zone is radiated from the baffle member, and the remainder is carried by convection. In the embodiment of FIG. 4, at least about 70% of the heat received by the food is transferred by radiation and the remainder by convection.

The vertically oriented baffle assembly 10 of the present invention may be a permanent component of a cooking unit or it may be removably secured in a cooking unit, and it may be used either in a cooker which also has a horizontal fire box or in a cooker having vertical assembly 10 as the only source of thermal energy.

Figure 5:
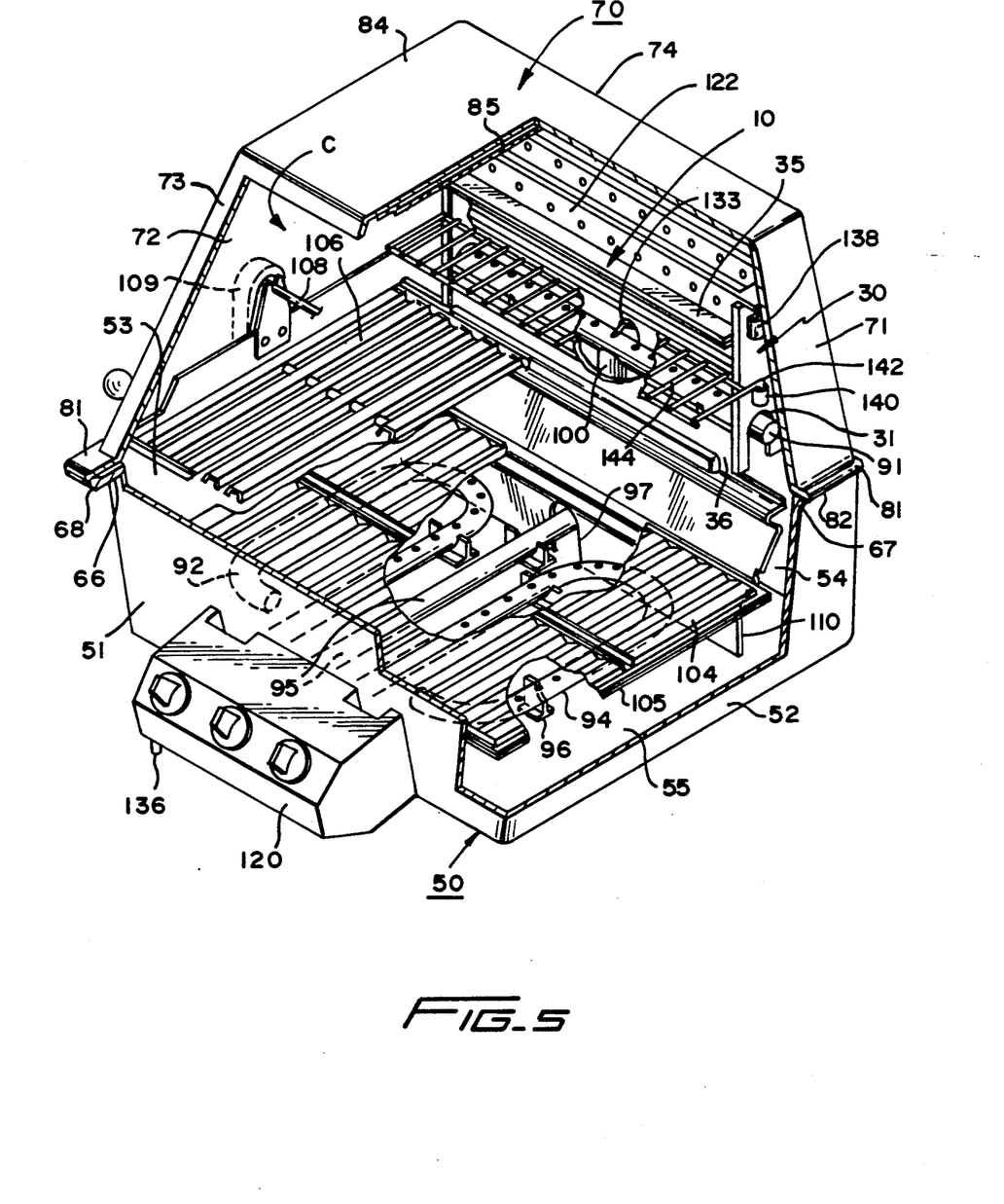
FIG. 5 is a perspective view in partial section showing the radiant baffle assembly of FIG. 1 installed in an outdoor gas-fired grill.

FIG. 5 shows the radiant baffle assembly 10 of FIG. 2 mounted in an outdoor gas-fired grill having a lower housing or base 50 and an upper hood 70. Housing 50 defines a horizontal firebox and comprises a front wall 51, opposing sidewalls 52 and 53, a rear wall 54, and a bottom wall 55.

Hood 70 comprises inwardly sloped sidewalls 71 and 72, inwardly sloped front and rear walls 73 and 74, respectively, and a top wall 84. Top wall 84 may be protected from hot combustion gases rising from the horizontal firebox, the vertical firebox, or both, by securing thereto an underlying heat baffle 85 of appropriate size, shape and location.

An outwardly projecting flange 81 having a depending lip 82 extends around the lower edge of the hood walls. Flange 81 is thus positioned around the base of hood 70 so as to rest upon a supporting lip 67 around the upper edges of rear and side housing walls 52-54 when the hood is in its closed position. The upper edge of front wall 51 comprises a forwardly projecting ledge 66 having an upstanding ridge 68 which serves as the supporting element for flange 81 at the front of the hood.

The width of flange 81 is such that depending lip 82 slips snugly over the outer periphery of housing lip 67 and ridge 68 so as to squarely position hood 70 upon the lower housing 50. The weight of hood 70 firmly seats the hood against horizontal displacement once it is in place over the lower housing. The hood 70 may be separate so as to be removable by raising it a sufficient distance to bring hood lip 82 clear of all abutting surfaces, or a lower part of hood rear wall 74 may be pivotally secured to an upper part of rear wall 54 of lower housing 50 by a pair of hinges (not shown) so that hood 70 is tiltable from front to back while remaining attached to housing 50.

Horizontal rear burner 91 is independently mounted on housing 50 by providing a pair of burner brackets 102 having depending and rearwardly projecting legs 103 and securing these legs directly to housing rear wall 54 as shown in FIG. 2. Rear burner 91 is detachably connected to a gas control means 120 by a gas supply conduit 95 which has a vertical segment 100 and passes freely through a central aperture 97 in a shield 110 depending from the lower forward corner of vertical firebox frame 30. In a preferred embodiment, burner 91 and its supply conduit 95 are free to be lifted out and separated from the grill assembly when the hood is open and the vertical firebox frame 30 is removed.

An alternative support arrangement for rear burner 91 is a suspended platform of the type shown in U.S. Pat. No. 4,089,258. In this arrangement, a horizontal platform (not shown) is supported by a dog leg hanger on the end adjacent to sidewall 53 and a dog leg hanger on the opposite end adjacent to sidewall 52. These hangers preferably are detachable and may be detachably seated upon rear segments of housing lip 67 extending along the rearward upper edges of sidewalls 52 and 53, respectively.

Adjacent to bottom wall 55 of housing 50 is a pair of P-shaped burners 92 and 94, which also are detachably connected to gas control means 120, for heating the horizontally firebox defined by housing 50. Burners 92 and 94 may be mounted on bottom wall 55 by burner brackets 96, which form a cradle for these tubular burners similar to brackets 102 for rear burner 91. Above burners 92 and 94 and the horizontal segment of conduit 95 is a coal grate 104 for supporting a bed of ceramic briquettes or other refractory material (not shown), which provide a source of radiant cooking heat from below a cooking grid 106 and a rotatably mounted spit 108 driven by an electric motor 109. The forward ends of grate 104 and grid 106 are supported by brackets (not shown) on or adjacent to the inside surfaces of front wall 51 and/or sidewalls 52 and 53 of lower housing 50.

The rear edges of grate 104 and grid 106 are supported by the forward panel or shield 110 depending from the forward lower corner of frame 30 as shown best in FIGS. 1 and 5. A horizontal segment of shield 110 provides a ledge 112 for supporting the rear of cooking grid 106 and a horizontally extending groove 114 provides a similar ledge for engaging and supporting a rear segment of a flange 105 extending around the periphery of coal grate 104.

Shield 110 keeps rear wall 54 of housing 50 relatively cool by reflecting heat from the flames of burners 92 and 94 and from the radiant ceramic briquettes which are heated by these flames as they rest on the top of grate 104 in the horizontal firebox. Shield 11 also protects from over heating the upstanding (vertical) segment of conduit 95, which runs vertically between shield 110 and rear wall 54 and is connected to the center of rear burner 91 to form a T-shaped burner structure when viewed in front elevation. Similarly, front wall 36 of firebox frame 30 serves as a heat shield to prevent over heating of horizontal rear burner 91.

A tray 122 may be provided in the upper portion of vertical firebox frame 30 above its top wall 35. Tray 122 may be periodically filled with woodchips 124 for generating food flavoring smoke. U.S. Pat. No. 4,697,506 to Ducate describes such a smoker tray and the entire contents of this patent are incorporated herein by reference. Although the radiant heat transmitted by top wall 35 and rear wall 33 has been found to be sufficient to slowly char (burn) woodchips 124, this radiant heat may be supplemented by allowing convection heat to pass through one or more apertures 124 and 126, which optionally may be provided respectively in the upper baffle portion and in the top frame wall, as illustrated in the upper baffle portion 24' and the top wall 35 of FIG. 3.

There also may be provided an igniter electrode 130 having its tip positioned to provide a spark for initially igniting gaseous fuel leaving burner 91 through port(s) 93. The base (not shown) of this electrode is housed in a vertically extending channel 132 covering a slot 133 in rear wall 33 of firebox frame 30, and is connected via an electrical wire 134 to an electrostatic generator (not shown) of the piezoelectric type, which is operated by a push button 136 depending from the casing of gas controls 120.

Firebox frame 30 may further include two pairs of U-shaped brackets 138 and 140, one bracket of each pair being secured to the respective sidewalls 32 and 34 of firebox 30 by corresponding fastening means, such as spot welded flanges 139,139 at the distal ends of each of the brackets 138,140 as may be seen best in FIG. 4. The outwardly projecting portions of both pairs of brackets 138,140 define generally cylindrical recesses for receiving the downwardly bent ends 142 of a warming rack 144, which thereby may be positioned at either of two different levels in front of radiant baffle assembly 10. At its lower level, rack 144 is directly in front of the radiant corrugations 22,22', and at its upper level, rack 144 is opposite to smoker tray 122.

Although only a few embodiments of the present invention have been described, other embodiments and variations may occur to those skilled in the art. It is accordingly understood that the foregoing description is intended to illustrate, and not to limit, the present invention as defined by the following claims.

What is claimed is:

1. A radiant baffle assembly for a cooking unit, said cooking unit including food support means for supporting food within a cooking zone, and fuel burner means having a burner element extending horizontally adjacent to a side of the cooking zone, said baffle assembly comprising:

baffle means for transferring into said side of the cooking zone thermal energy generated by combustion of a fuel discharged from said burner element, said baffle means comprising a surface positioned to radiate a substantial portion of said thermal energy into said side of the cooking zone, and an upper portion extending upwardly relative to said burner element and transversely toward said side of the cooking zone to direct into said side of the cooking zone hot combustion gases flowing upward from the combustion of said fuel; and, means for mounting said baffle means relative to said burner element so that said baffle means receives said thermal energy from the combustion of said fuel; said mounting means comprising a rear member rearward of said burner element, an upper member extending forward of said burner element, and connecting means extending between and interconnecting said rear member and said upper member; a lower segment of said baffle means being secured to said rear member and an upper segment of said baffle means being secured to a forward part of said upper member; and the upper portion of said baffle means being supported between said lower segment and said upper segment such that said upper portion is free to thermally expand and contract relative to said connecting means.

2. A radiant baffle assembly according to claim 1 wherein said baffle means comprises a lower portion having at least one ridge positioned to receive and to radiate a portion of said thermal energy into said side of the cooking zone, and wherein said lower portion is positioned between said upper portion and said lower segment of the baffle means such that said lower portion and said upper portion are both free to thermally expand and contract relative to said connecting means.

3. A radiant baffle assembly according to claim 2 wherein at least 80% of said transferred thermal energy is radiated into said side of the cooking zone by said surface.

4. A radiant baffle assembly according to claim 2 wherein said lower portion has a plurality of horizontally extending corrugations forming a corrugated surface for radiating said thermal energy.

5. A radiant baffle assembly according to claim 4 wherein said corrugations comprise a plurality of horizontally extending ridges each connected to another by a groove to provide a smoothly sinuous profile in transverse cross section.

6. A radiant baffle assembly according to claim 5 wherein said upper portion of said baffle means comprises a smoothly-curved concave surface.

7. A radiant baffle assembly according to claim 1 wherein said upper portion of said baffle means comprises a smoothly-curved concave surface.

8. A radiant baffle assembly according to claim 4 wherein said corrugations comprise a plurality of horizontally extending ridges each connected to another by a groove to provide a sawtooth profile in transverse cross section.

9. A radiant baffle assembly according to claim 8 wherein said upper portion of said baffle means comprises a substantially planar surface.

10. A radiant baffle assembly according to claim 1 wherein said upper portion of said baffle means comprises a substantially planar surface.

11. A radiant baffle assembly according to claim 2 wherein said baffle means comprises a single piece of stamped metal.

12. A radiant baffle assembly according to claim 11 wherein said metal is corrosion and heat resistant stainless steel.

13. A radiant baffle assembly according to claim 4 wherein said corrugations comprise at least three ridges each connected to another by a groove.

14. A radiant baffle assembly according to claim 1 wherein said connecting means comprises a pair of spaced-apart vertically-extending side members positioned in opposing relation to each other, and wherein said rear member and said upper member of said mounting means each extend between and interconnect said side members.

15. A radiant baffle assembly according to claim 14 further comprising front wall means extending horizontally between and connecting said side members, said front wall means comprising a wall portion extending from a level below to a level above a burner member of said burner means so as to shield said burner member from a horizontal heating zone forward of said wall portion.

16. A radiant baffle assembly according to claim 14 further comprising front wall means extending horizontally between and connecting said side members, said front wall means comprising a depending wall portion extending below the level of a burner member of said burner means so as to shield at least part of a rear wall of a housing means defining a horizontal heating zone forward of said depending wall portion.

17. A radiant baffle assembly according to claim 16 wherein said food support means comprises grill means, wherein said cooking unit further includes grid means for supporting a bed of refractory material beneath said grill means, and wherein said depending wall portion comprises means for supporting an edge part of said grill means and an edge part of said grid means.

18. A radiant baffle assembly according to claim 14 wherein an upper end portion of each of said side members extends above said upper member and comprises support means for engaging a corresponding end of a container to support said container in a position for receiving sufficient thermal energy to cause woodchips held in said container to burn and generate smoke for flavoring food supported by said food support means.

19. A radiant baffle assembly according to claim 18 wherein at least one aperture is provided in the upper baffle portion and in the upper member of said mounting means for conveying a portion of said hot combustion gases to said container to provide at least a portion of the thermal energy for burning the woodchips held in said container.

20. A radiant baffle assembly according to claim 1 wherein said mounting means further comprises bracket means mounted on said rear member for engaging a rear wall of a housing means to support said baffle means adjacent to said side of the cooking zone, said housing means defining at least part of the cooking zone.

21. A radiant baffle assembly according to claim 1 wherein the rear member of said mounting means defines a channel for housing an electrode means for providing an electrical spark for igniting the fuel discharged by said burner means.

22. A radiant baffle assembly according to claim 14 further comprising a horizontally extending rack means for supporting food in said cooking zone, and means carried by each of said side members for engaging a corresponding end of said rack means to support an intermediate section of said rack means in opposing relation to said baffle means.

23. A radiant baffle assembly according to claim 4 wherein said corrugations comprise a plurality of horizontally extending ridges each connected to another by a horizontally extending groove to provide said corrugated radiating surface, and wherein each of said ridges extends at least partially over a flame zone in which flames burn said fuel.

24. A radiant baffle assembly according to claim 14 wherein said rear member forms a backwall, wherein each of said side members forms a sidewall facing a corresponding side edge of said upper baffle portion, and wherein said back wall and said sidewalls are provided by a single piece of stamped metal.

25. A radiant baffle assembly according to claim 1 wherein said burner element is elongated along a burner axis parallel to said side of the cooking zone, said upper segment of the baffle means comprises an elongated strip, and said forward part of said upper member of the mounting means is elongated in a direction parallel to said burner axis and is secured to said baffle means along a substantial length of said elongated strip.

26. A radiant baffle assembly for a cooking unit, said cooking unit including food support means for supporting food within a cooking zone, and fuel burner means having a burner element extending horizontally adjacent to a side of the cooking zone, said baffle assembly comprising:
baffle means for transferring into said side of the cooking zone thermal energy generated by combustion of a fuel discharged from said burner element, said baffle means comprising a surface positioned to radiate a substantial portion of said thermal energy into said side of the cooking zone, and an upper portion extending upwardly relative to said burner element and transversely toward said side of the cooking zone to direct into said side of the cooking zone hot combustion gases flowing upward from the combustion of said fuel;
means for mounting said baffle means relative to said burner element so that said baffle means receives said thermal energy from the combustion of said fuel;
support means for supporting a container for holding woodchips in spaced relation over at lest a portion of said baffle means; and,
means for conveying a portion of the hot combustion gases from combustion of said fuel to said container to provide thermal energy for burning woodchips held in said container to generate smoke for flavoring food supported by said food support means.

27. A radiant baffle assembly according to claim 26 wherein said mounting means comprises a pair of spaced-apart vertically-extending side members, wherein said support means comprises an upper end portion of each of said side members extending above said baffle means for engaging a corresponding end of said container, and wherein at lest one aperture is provided in said upper baffle portion for conveying said portion of the hot combustion gases to said container.

28. A radiant baffle assembly for a cooking unit, said cooking unit including food support means for supporting food within a cooking zone, and fuel burner means having a burner element extending horizontally adjacent to a side of the cooking zone, said baffle assembly comprising:
baffle means for transferring into said side of the cooking zone thermal energy generated by combustion of a fuel discharged from said burner element, said baffle means comprising a baffle member having an upper portion and a lower portion and providing a surface positioned to radiate a substantial portion of said thermal energy into said side of the cooking zone; and,
means for mounting said baffle member relative to said burner element so that said baffle member receives said thermal energy from the combustion of said fuel;
said upper portion extending upwardly relative to said burner element and transversely toward said side of the cooking zone to direct into said side of the cooking zone hot combustion gases flowing upward from the combustion of said fuel;
said lower portion comprising a corrugated heat radiating surface formed by a plurality of horizontally extending ridges each connected to another by a horizontally extending groove;
said mounting means comprising a rear member, an upper member, and connecting means extending between and interconnecting said rear member and said upper member;
and a lower segment of said baffle member being secured to said rear member and an upper segment of said baffle member being secured to said upper member such that both the upper portion and the lower portion of said baffle member are free to thermally expand and contract relative to said connecting means.

29. A radiant baffle assembly according to claim 28 wherein said ridges extend at least partially over a flame zone in which flames burn said fuel such that at least said lower portion is heated to radiant temperatures by said hot combustion gases.

* * * * *

UNITED STATES PATENT AND TRADEMARK OFFICE
CERTIFICATE OF CORRECTION

PATENT NO.   :   5,129,312
DATED        :   July 14, 1992
INVENTOR(S)  :   Bernard B. Berger It is certified that error appears in the above-identified patent and that said Letters Patent is hereby corrected as shown below:

Column 10, line 2, change "lest" to --least--.

Signed and Sealed this

Thirty-first Day of August, 1993

*Attest:*

BRUCE LEHMAN

*Attesting Officer*  *Commissioner of Patents and Trademarks*